Patented Sept. 12, 1950

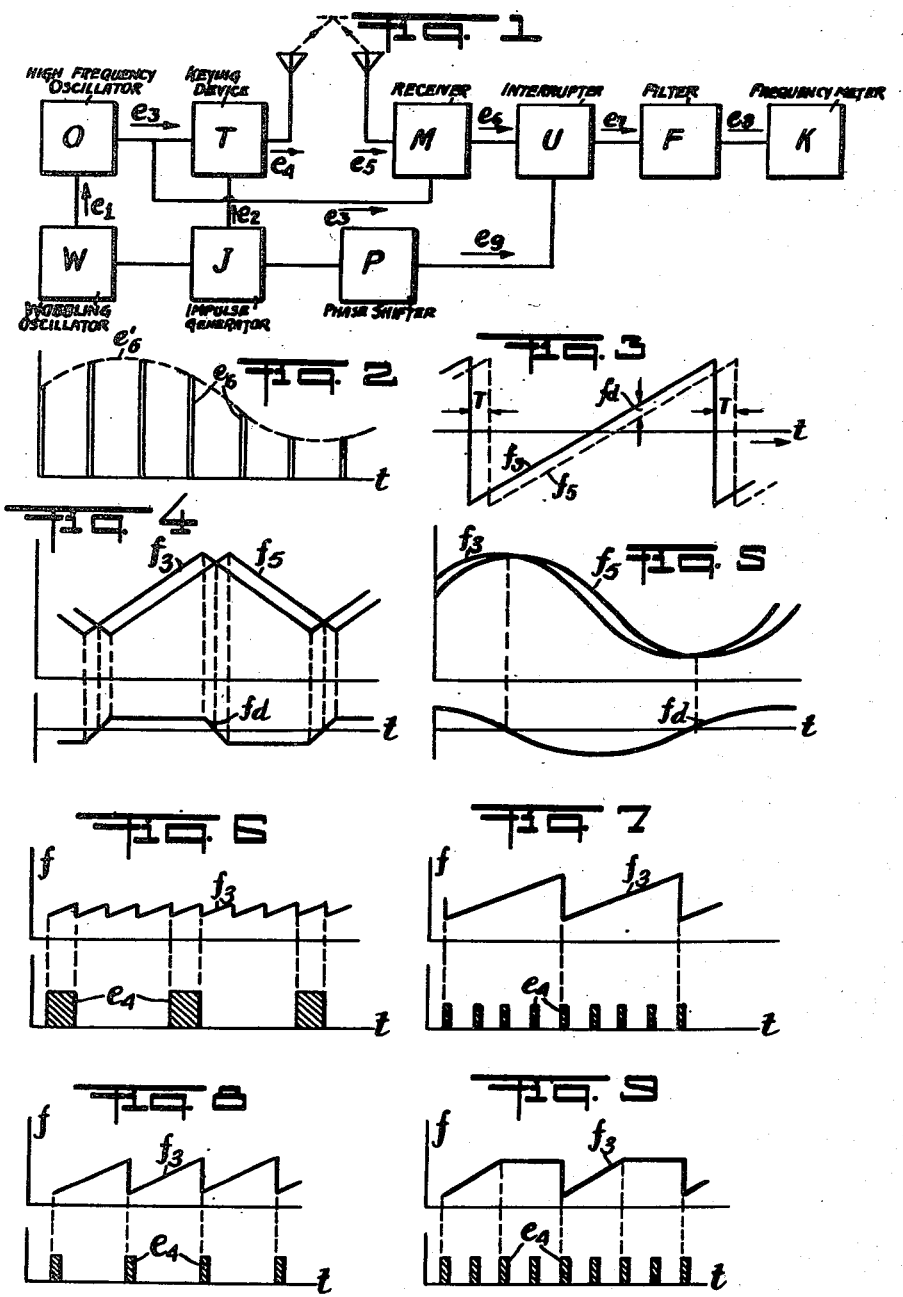

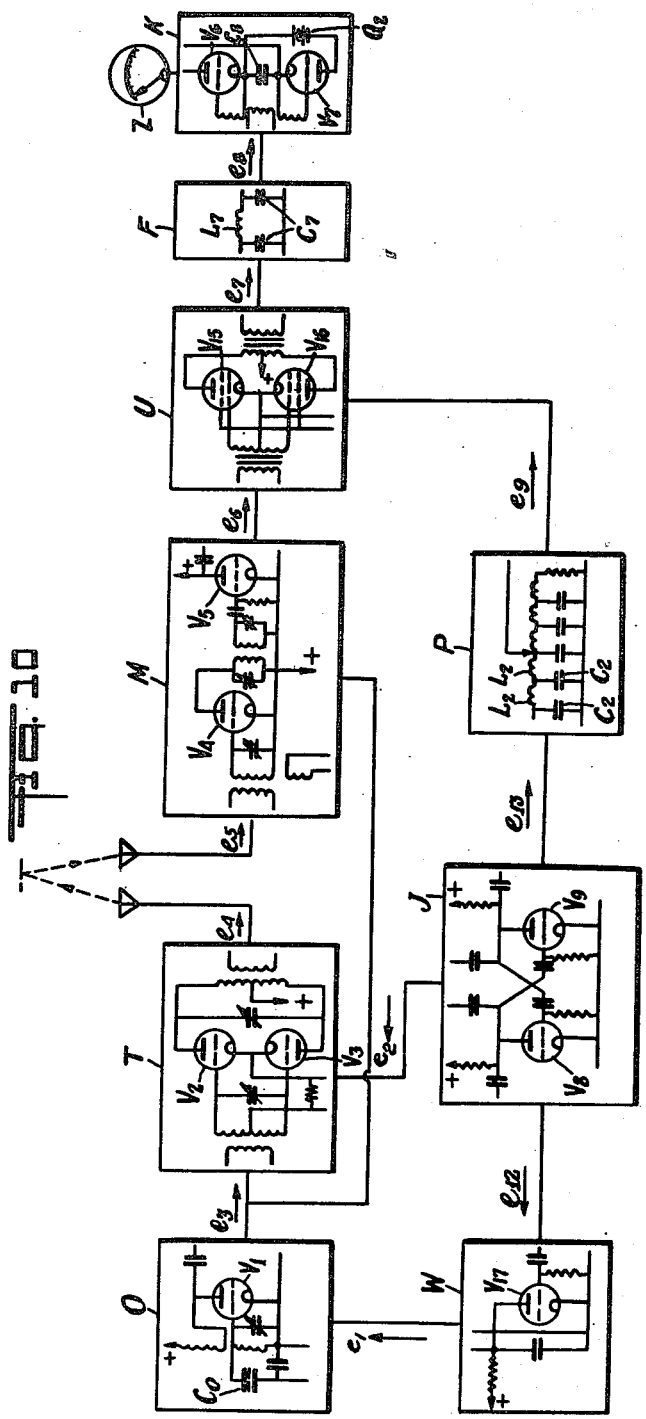

2,522,367

UNITED STATES PATENT OFFICE 2,522,367

RADIO DISTANCE MEASURING SYSTEM

Gustav Guanella, Zurich, Switzerland, assignor to Radio Patents Corporation, New York, N. Y., a corporation of New York Application July 28, 1945, Serial No. 607,568
In Switzerland August 5, 1944

3 Claims. (Cl. 343—13)

1

According to known methods of measuring distances, high frequency impulses are radiated and after reflection by a distant object are received again, the distance of said object being determined by measuring the transit or propagation time of said impulses. A considerable disadvantage of these methods is the fact that the measurement of the distance is affected by disturbing voltages which occur during the intervals between the received impulses. Furthermore it is difficult to determine the distance exactly owing to the high speed of propagation of the high frequency impulses. Other methods are known where high frequency oscillations are radiated and received again, the frequency of these oscillations being varied or modulated periodically according to a saw-tooth pattern. Between the oscillations reaching the receiver via the reflection point and those applied directly to the receiver, a beat occurs in the receiver whose frequency is proportional to the distance if the reflecting object is stationary. This frequency may be measured with comparatively simple means in order to determine the distance. Since the transmitting oscillations are radiated continuously, the transmitting amplitudes are smaller than when impulses are employed, so that the amplitudes of the received signals are in many cases too weak compared with unavoidable disturbing voltages (receiver noise, etc.).

The present invention concerns a method of and means for radio location, more particularly for determining the distance of objects according to the reflected wave principle using high frequency, acoustic or electromagnetic oscillations radiated in the form of impulses and received again in a receiver. According to the invention, the frequency of the transmitted oscillations is combined with the frequency of the reflected impulses, whereby from this combination impulses are formed whose height varies in accordance with the difference frequency of the transmitted and received oscillations, the frequency of the transmitted oscillation being varied or modulated periodically at least during part of the transmission time.

The invention will become more apparent from the following detailed description taken in reference to the accompanying drawings forming part of this specification and wherein:

Fig. 1 is a block diagram of a radio location system constructed in accordance with the principles of the invention; Figs. 2–9 show various theoretical curves and diagrams explanatory of the function and operation of the invention; and

2

Fig. 10 is a more detailed circuit diagram illustrating a system according to the invention.

Like reference characters identify like parts in the different views of the drawings. Fig. 1 shows a transmitting and receiving installation for carrying out the method according to the invention. The frequency of the oscillation $e_3$ produced by a high frequency generator O is varied periodically by the modulating voltage $e_1$ produced by a frequency wobbler or oscillator W. This modulation may also be achieved mechanically, such as by means of a rotating variable condenser. The alternating voltage $e_3$ is periodically interrupted by the keying device T, so that oscillation impulses $e_4$ to be radiated are produced. The keying or pulsing is carried out by means of the control impulses $e_2$ of a pulse generator J. Impulses $e_5$ obtained in the receiver M after being reflected from the object whose position is to be determined, are compared or combined with the unkeyed transmitting voltage $e_3$. The oscillations may be compared by superimposition and rectification of the sum voltage or by means of an intermodulation method. If the frequency is varied at a rate which is low compared with the repetition rate of the impulses $e_4$ as shown in Fig. 7, pulses $e_6$ of varying amplitudes are obtained in this manner according to an enveloping alternating voltage $e_6'$, as shown in Fig. 2, which is periodically interrupted in accordance with the keying intervals at the transmitter. The reflected impulses $e_5$ and the impulses $e_6$ formed by comparison can be freed from disturbing voltages of low amplitude by an amplitude limiter. In the apparatus shown in Fig. 1 an interrupter U is provided for suppressing disturbing signals occurring during the impulse intervals. This interrupter is operated by control impulses $e_9$ in such a manner that transmission occurs only a short time before the impulses $e_6$ appear and is interrupted shortly afterwards. Control voltage $e_9$ is also supplied by the pulse generator J, a special phase shifting or retarding device P serving for adjusting the phase position in accordance with the transit time of the reflected impulses. Components of high frequency are suppressed by low-pass or band-pass filtering by means of filter F, so that a periodically interrupted alternating voltage $e_8$ is obtained, whose frequency coincides with the desired difference frequency of the compared oscillations $e_3$ and $e_5$. This alternating voltage $e_8$ is indicated by a frequency-sensitive instrument K, for instance a frequency meter.

The method according to the invention may also be carried out by means of circuits employing super-regeneration wherein the frequency of the quenching voltage coincides with the impulse frequency at the transmitting end and wherein the phase position of the quenching voltage can be adjusted in dependence upon the transit time of the reflected impulses.

The aforesaid method may be carried out by radiating short or long impulses. Short impulses are those whose duration is smaller than the maximum transit time of the reflected impulses $e_5$, in which case the latter are compared with the unkeyed transmitting oscillation $e_3$ in a circuit shown in Fig. 1. Long impulses on the other hand are those whose duration is greater than the maximum transit time of the reflected impulses $e_5$, so that the latter partly coincide in time with the transmitter impulses. In this case the directly received transmitting impulses $e_4$ may be combined with the reflected impulses $e_5$ appearing in the receiver.

In general the frequency $f_2$ of the keying voltage $e_2$ is greater than the difference frequency $f_d$ of the combined oscillations so that there is a definite number of impulses for each oscillation period corresponding to the difference frequency, as can be seen from Fig. 2. There may, however, be several oscillation periods corresponding to the difference frequency of the compared oscillations during one period of an impulse. In this case the keying frequency $f_2$ is small compared with the difference frequency $f_d$ and voltage $e_6'$ occurs in the form of a sinusoidal voltage which is interrupted after several oscillation periods. The difference frequency $f_d$ may then also be measured by suppressing a large part of the combination frequencies $(f_d \pm nf_2)$ by the filter F, so that at the output end of the filter only the desired oscillation components $e_3$ remain.

Frequency $f_3$ of the transmitting oscillation $e_3$ may be varied according to a saw-tooth wave shape as shown by the solid line in Fig. 3. The frequency $f_5$ of the reflected impulses is indicated by the broken line and is displaced in time relatively to the frequency of transmitting oscillation $e_3$ in accordance with the impulse transit time T. The difference frequency $f_d$ of the compared oscillations $e_3$ and $e_5$ is proportional to the range $s$ of the reflecting object according to the relationship $$f_d = 2\pi \frac{s}{c}$$

c being the wave propagation velocity. Its magnitude also depends on the frequency limits within which the transmitting frequency is varied.

The transmitting frequency $f_3$ may also be varied according to a wave shown in Fig. 4 wherein the frequency increases linearly and decreases at the same rate. The difference frequency $f_d$ of the compared oscillations $e_3$ and $e_5$ thus has a constant value, apart from short transition periods. Furthermore the variation of the transmitting frequency may be carried out in accordance with a sinusoidal wave as shown in Fig. 5, whereby the difference frequency $f_d$ also follows a sinusoidal course.

The duration of the modulation periods may coincide with the duration of a transmitting impulse $e_4$; that is the transmitting voltage $e_3$ may be radiated during the duration of a modulation period and interrupted during several following modulation periods, as is shown in Fig. 6. The duration of the transmitting impulses $e_4$ and the intervals between successive impulses may also have a whole number relationship to the duration of a wobbling period, this being achieved for instance by a definite number of impulses and impulse pauses occurring during each wobbling or modulation period, as shown in Fig. 7. Conditions may also be such that during each modulation period of the transmitting frequency $f_3$ an impulse $e_4$ is transmitted, whereby according to Fig. 8 the starting point of each transmitting impulse is preferably made to coincide with the beginning of the wobbling period. In this case there are no undesirable variations and periodic disturbances in the difference frequency $f_d$, due to the latter being repeated during each wobbling period.

With the method according to the invention it is advantageous to use a modulating device which enables the duration of the modulating period of the transmitting frequency $f_3$ to be varied, so that depending on the prevailing conditions the relationships shown in Figs. 7, 8 and 9 may be selected as desired. Since the distances which are to be determined often vary within wide limits it is expedient to employ a frequency wobbling device the deviation limits of which may be varied, so that the difference frequency $f_d$ assumes a definite constant value. The desired distance may then be determined from the adjustment of the wobbling limits.

The transmitting and receiving arrangements for performing the invention may also contain means for effecting a continuous measurement of the transit time of the reflected impulses by using a standard pulse echo method. The measurement of the impulse transit time thus represents a rough measurement of the distance, whilst the beat frequency method according to the invention enables the distance to be measured accurately. The impulse transit time can for instance be determined in a known manner by means of a cathode ray tube wherein the deflection in the X-direction is synchronized with the number of impulses radiated and wherein the received reflected impulses are applied to the Y-deflection system of the tube.

In order to determine the distance and velocity of moving objects simultaneously, the frequency of the transmitting oscillation may also be kept constant for a time, whereby the value of the difference frequency $f_d$ of the compared oscillations will be proportional to the relative velocity of the reflecting object in accordance with the Doppler effect. The value of the difference frequency $f_d$ of the compared oscillations which occurs when the transmitting frequency is modulated thus consists of a velocity-proportional frequency component and a distance-proportional component. The transmitting frequency $f_3$ may in this case be varied according to a wave form as shown in Fig. 9, wherein there are a definite number of impulses and impulse intervals both during the rising and straight-line part of the wobbling period. The different values of the difference frequency $f_d$ which occur with a constant and a wobbled transmitting frequency, respectively, may be measured with different frequency measuring devices whose indicating devices may be located one above the other, so that the difference in the pointer deflections of the devices indicates the distance directly.

The block diagram shown in Fig. 1 will be described in greater detail by reference to Fig. 10 which shows the various circuits of the individual elements of the system.

Oscillator O comprises an amplifier tube $V_1$ provided with a regenerative feed-back circuit and including a tuning condenser $C_0$ whose capacitance may be varied by the control voltage $e_1$, so that the oscillator frequency varies in dependence on this voltage. Such a condenser may for instance consist of a dry-plate electronic rectifier biased in the current blocking direction and which is known to act as a capacitance, the magnitude of the capacitance depending on the blocking voltage. Keying device T contains in the example shown, a pair of tubes $V_2$, $V_3$ connected in push-pull by means of which the high frequency voltage $e_3$ is transmitted. Keying impulses $e_2$ are applied simultaneously to the grids of these tubes, so that the transmission of oscillating energy is blocked during the keying intervals. In the receiver M impulses $e_5$ received after reflection from a distant object are superimposed upon the unkeyed high frequency voltage $e_3$, amplified by means of amplifier tube $V_4$, and rectified by means of a detector tube $V_5$, so that impulses $e_6$ are formed. These impulses are freed from any disturbing voltages by an interrupter or gating device U, the push-pull connected tubes $V_{15}$, $V_{16}$ of the latter being blocked by the blocking voltage $e_9$ during the impulse intervals. Impulses $e_7$ which are now free of disturbing voltages are freed of all higher frequency components by means of low-pass filter F, so that an alternating voltage $e_8$ results whose frequency is proportional to the impulse transit time. This frequency is measured by periodically charging a condenser $C_8$ of a cycle counter type frequency discriminator K and discharging this condenser through an indicating instrument Z. Condenser $C_8$ is charged by battery $Q_2$ through tube $V_7$ and discharged through tube $V_6$. These two tubes are alternately blocked by the alternating voltage $e_8$ which is to be measured.

The voltage $e_1$ by which the frequency of the high frequency generator O is modulated is generated in the oscillation generator W comprising a gas-filled discharge tube $V_{17}$, which in a known manner produces a saw-tooth oscillation voltage. Impulses $e_2$ are produced in a pulse generator J which contains the tubes $V_8$, $V_9$ arranged in multi-vibrator circuit connection. Voltage $e_1$ may be synchronized by the output voltage $e_{12}$ of the impulse generator. Retardation circuit P with series inductances $L_2$ and parallel capacitances $C_2$ serves to produce the control voltage $e_9$ for the interrupter U from the output voltage $e_{13}$ of the pulse generator J.

The various operations involved in the method according to the invention are further explained by the following mathematical analysis, wherein $E_1$, $E_2$, etc. represent the amplitudes of the alternating voltages $e_1$, $e_2$, etc., whilst $\omega_1$, etc., indicates the frequency in radians. Thus (1) $\qquad e_1 = E_1.x(t)$ wherein $x(t)$ represents a saw-tooth function which follows a linear course between the values 0 and 1. The frequency $\omega_3$ of $e_3$ thus varies according to the following equation:

(2) $\qquad \omega_3 = \omega_0[1 + k_3 x(t)]$

The relation of the capacitance $C_0$ to its control voltage is indicated by the constant $k_3$. As a result of the periodic interruption by keying device T, high-frequency impulses $e_4$ are produced the amplitude of which varies between 0 and $A_4$. If $Z(t)$ indicates a switching function which in accordance with the impulses $e_2$ varies between the values 0 and 1, $e_4$ is represented as follows:

(3) $\qquad E_4(t) = A_4.Z(t)$

The radiated high frequency impulses are received again in the receiver with a time delay $T_d$ corresponding to the transmission path. The amplitude $E_5$ of impulses $e_5$ is then as follows:

(4) $\qquad E_5(t) = A_5.Z(t-T_d)$

If as in the case of $e_3$, $e_4$ are unkeyed high frequency oscillations, then the amplitude of $e_5$ would also be constant and the frequency $\omega_5(t)$ of the received voltage at the moment $t$ would coincide with the frequency $\omega_3(t-T_d)$ at the earlier instant $(t-T_d)$. Thus (5) $\qquad \omega_5(t) = \omega_3(t-T_d)$ By superposing the receiving voltage $e_5$ with the transmitting voltage $e_3$ a voltage $e_6$ occurs in receiver M the frequency $\omega_6$ of which coincides with the difference frequency $\omega_3 - \omega_5$:

(6) $\omega_6(t) = \omega_3 - \omega_5 = \omega_0[1 + k_3.X(t)] - $
$\omega_0[1 + k_3.X(t-T_d)] = $
$\omega_0.k[X(t) - X(t-T_d)] = \omega_d$ This difference voltage $\omega_d$ is of course proportional to the transmission or transit time $T_d$. With unkeyed transmitting impulses a receiver output voltage $a_6$ is obtained:

(7) $\qquad a_6(t) = A_6.\sin(\omega_d.t - \varphi)$

If in accordance with the invention unkeyed transmitting impulses are used, then the receiving voltage shows periodic interruptions according to the switching-in function $Z(t-T_d)$ of Equation 4. The same interruptions also exist for the receiver output voltage $e_6$.

(8) $e_6 = a_6(t).Z(t-T_d) + N(t) = $
$A_6.Z(t-T_d)\sin(\omega_d.t - \varphi) + N(t)$ where $N(t)$ indicates the receiver disturbances. For the purpose of eliminating disturbances a further periodic interruption of $e_6$ by means of interrupter U is employed. The interruption process is controlled by the switching pulses $e_9$ which are obtained from $e_{13}$ and $e_2$ by retarding by the amout $T_p$.

(9) $\qquad e_9(t) = A_9.Z(t-T_p)$

At the output end of the interrupter impulses $e_7$ are obtained.

(10) $e_7(t) = Z(t-T_p).e_6 = $
$A_6.Z(t-T_d).Z(t-T_p)\sin$
$(\omega_d.t - \varphi) + Z(t-T_p).N(t)$ The adjustable retardation time $T_p$ is regulated to the same magnitude as the transmission transit time $T_d$:

(11) $\qquad T_p = T_d$

For impulses $e_7$ the following equation then applies:

(12) $e_7(t) = A_6.Z(t-T_d).\sin$
$(\omega_d.t - \varphi) + Z(t-T_d).N(t)$

By comparison with Equation 8 it is clear that the disturbing portion of this voltage is smaller than with $e_6$, because also the disturbances during the impulse intervals are interrupted. Filter F suppresses the higher frequency components of $e_7$ so that an alternating voltage $e_8$ remains, the frequency of which coincides with the beat frequency $\omega_d$.

(13) $e_s = A_s \sin(\omega_d t - \varphi) + M_0(t)$

The remaining disturbing portion $M_0(t)$ can be kept very small because all disturbing frequencies which deviate considerably from the prevailing beat frequency $\omega_d$ can be suppressed by filtering. The frequency of this alternating voltage which is proportional to the transit time $T_d$ which is to be determined, is measured in order to determine the transmission path or distance of the object being located.

If the reflection point is moving relatively to the transmitter, additional frequency changes occur, a result of the Doppler effect which have to be added to or subtracted from the beat frequency $\omega_d$. With suitable means it is also possible to determine both the distance and the relative speed from the corresponding changes in the beat frequency.

I claim:

1. A radio distance determining system comprising generating means for producing high frequency energy having a frequency varying cyclically according to a predetermined modulating wave, means for transmitting said energy as successive wave pulses of different frequency representative of corresponding instantaneous values of said modulating wave towards a distant object and for receiving said wave pulses after reflection by said object, said pulses having a duration being small compared with the duration of a modulating cycle and following each other with a frequency being a substantial multiple of the frequency of said modulating wave, and means for combining the received pulse energy with unpulsed modulated energy directly derived from said generating means, to produce a pulsed wave comprised of pulses having amplitudes varying in accordance with the instantaneous values of the beat wave resulting from the combined direct and reflected energies, further means for converting said pulsed beat wave into a continuous wave, and means for translating the frequency of said continuous wave.

2. A radio distance determining system comprising generating means for producing high frequency energy having a frequency varying linearly and cyclically according to a given modulating wave, means for transmitting said energy as successive wave pulses of different frequency representative of corresponding instantaneous values of said modulating wave towards a distant object, means for receiving said wave pulses after reflection by said object, said pulses having a duration being small compared with the duration of a modulating cycle and following each other with a frequency being a substantial multiple of the frequency of said modulating wave, further means for combining the received pulse energy with unpulsed modulated energy directly derived from said generating means, to produce a pulsed wave comprised of pulses having amplitudes varying in accordance with the instantaneous values of the beat wave resulting from the combined direct and reflected energies, further means for converting said pulsed wave into a continuous wave, and means for translating and indicating the frequency of said continuous wave.

3. A radio distance determining system comprising generating means for producing high frequency energy having a frequency varying according to a saw-tooth wave, means for transmitting said energy as successive wave pulses of different frequency representative of corresponding instantaneous values of said saw-tooth wave towards a distant object and for receiving said pulses after reflection by said object, said pulses having a duration being small compared with a cycle of said saw-tooth wave and following each other with a frequency being a substantial multiple of the frequency of said saw-tooth wave, further means for combining the received pulse energy with unpulsed modulated energy directly derived from said generating means, to produce a pulsed wave comprised of pulses having amplitudes varying in accordance with the instantaneous values of the beat wave resulting from the combined direct and reflected energies, further means for converting said pulsed wave into a continuous wave, and means for translating and indicating the frequency of said continuous wave.

GUSTAV GUANELLA.

REFERENCES CITED

The following references are of record in the file of this patent:

UNITED STATES PATENTS

| Number | Name | Date |
|---|---|---|
| 2,225,046 | Hunter | Dec. 17, 1940 |
| 2,208,422 | Hugon | July 16, 1940 |
| 2,268,587 | Guanella | Jan. 6, 1942 |
| 2,371,988 | Granquist | Mar. 20, 1945 |
| 2,403,527 | Hershberger | July 9, 1946 |
| 2,403,625 | Wolff | July 9, 1946 |
| 2,406,316 | Blumlein et al. | Aug. 27, 1946 |
| 2,408,742 | Eaton | Oct. 8, 1946 |
| 2,423,644 | Evans | July 8, 1947 |
| 2,424,854 | Sanders | July 29, 1947 |
| 2,467,670 | Hershberger | Apr. 19, 1949 |